Figure 1:
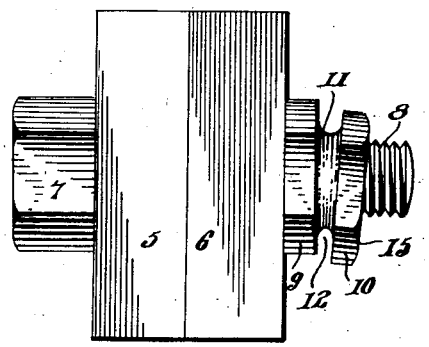

H. G. NORWOOD.
LOCK NUT.
APPLICATION FILED OCT. 22, 1921.

1,406,065. Patented Feb. 7, 1922.

Inventor
Harry G. Norwood

By J. K. Bryant.
Attorney

UNITED STATES PATENT OFFICE.

HARRY G. NORWOOD, OF BALTIMORE, MARYLAND.

LOCK NUT.

1,406,065.

Specification of Letters Patent. Patented Feb. 7, 1922.

Application filed October 22, 1921. Serial No. 509,476.

*To all whom it may concern:*

Be it known that I, HARRY G. NORWOOD, a citizen of the United States of America, residing at Baltimore, in the county of Baltimore City and State of Maryland, have invented certain new and useful Improvements in Lock Nuts, of which the following is a specification.

This invention relates to nut locks and the object of the invention is to provide a lock nut which will automatically lock the nut to a bolt when the face of the nut is forced against an abutting surface and which may also be reversely employed upon the bolt for having a portion of the nut manually displaced after the nut is screwed home for locking the nut to the bolt.

A further object is to provide an improved lock nut formed in a single piece.

Still another object is to provide a nut lock which will be permanently distorted for changing or distorting the threads of the nut and bolt for a limited distance when the nut is set in locked position.

With the above general objects in view and others that will become apparent as the nature of the invention is better understood, the invention consists in the novel form, combination and arrangement of parts hereinafter more fully described in connection with the accompanying drawing, in which like characters of reference indicate corresponding parts throughout the several views.

Figure 5:
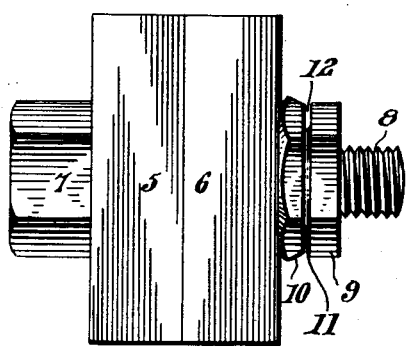
Figure 2:
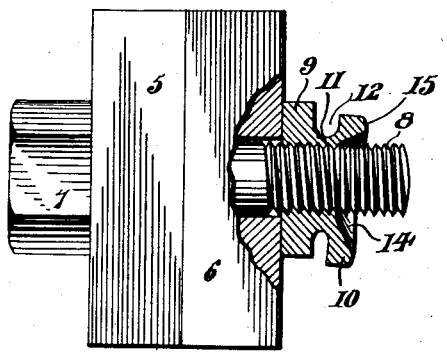
Figure 6:
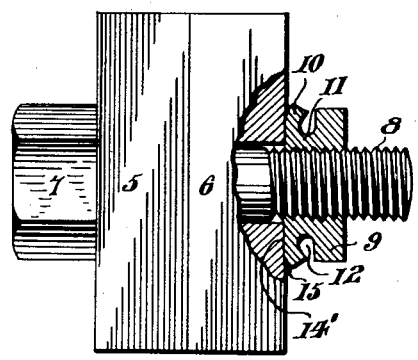
Figure 3:
Figure 4:
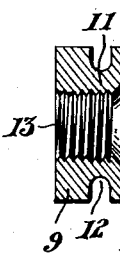
Figure 7:
Figure 8:
Figures 9, 10:
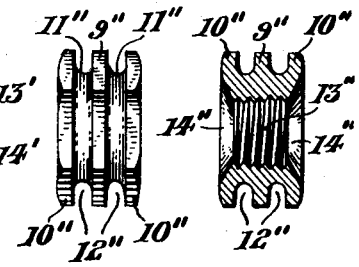

In the drawing,

Figure 1 is an elevational view showing a lock nut constructed in accordance with the present invention in locked relation upon a bolt, Figure 2 is a view similar to Figure 1 with parts broken away, and in section, Figure 3 is an elevational view of the nut shown in Figures 1 and 2 in its normal condition, Figure 4 is a central longitudinal sectional view of the device shown in Figure 3, Figure 5 is a view similar to Figure 1 illustrating the nut as it appears in locking position when turned home upon a bolt and when reversed as compared to the use shown in Figure 1, Figure 6 is a view similar to Figure 2 of the device shown in Figure 5, Figure 7 is an elevational view of a modified form of the nut shown in Figure 3, Figure 8 is a view similar to Figure 4 of the nut shown in Figure 7, Figure 9 is a view similar to Figure 7 of a still further modified form of nut and Figure 10 is a view similar to Figure 8 of the nut shown in Figure 9.

Referring to the form and use of the invention set forth in Figures 1 to 4 inclusive, 5 and 6 indicate two sheets of iron or the like that are to be bolted together, and 7 a bolt, the shank of which is provided with a uniform thread 8 in the usual manner.

The lock nut of the present invention preferably consists in two portions 9 and 10 respectively which are connected by a thin annular yielding, substantially non-resilient ring-like portion 11, produced by the formation of a continuous external annular groove 12 in an ordinary nut blank which may be provided with a square or hexagonal surface for proper engagement by a wrench in the usual way.

The nut is provided with the usual bore which is of uniform diameter through the portions 9 and 11 and which is of increased diameter in the portion 10, the wall of the bore in the portions 9 and 11 having the usual internal thread 13 of constant pitch and the wall of the bore in the portion 10 being preferably smoothed and flared as at 14. By the proper provision of cutters, the threaded bore 13 and the flaring bore 14 may be simultaneously formed in the manufacture of the nut and in the form of the invention shown in Figures 1 to 4 inclusive, the portion 9 is preferably made thicker and heavier to constitute a body portion with the portion 10 acting as a movable locking portion by the provision of the groove 12 nearer the face of the portion 10 than the face of portion 9.

There are two of the known methods of employing this form of nut shown herein respectively in Figures 1 and 2 and Figures 5 and 6. In the use of the invention as shown in Figures 1 and 2, the body portion 9 is adapted to be threaded onto the shank of the bolt first so that the face of the body portion 9 forms the abutting surface of the nut, and upon screwing of the nut home, it will retain its non-locking normal shape of Figure 3 when tightly engaged with the adjacent surface of the sheet of iron 6 or other work. The locking portion 10 is then given a blow by means of a hammer or the like upon the upper wrench-engaging face thereof, and due to the fact that the thin connecting portion 11 is relatively weak and yielding, the portion 10 will thereby be tilted to a position oblique to the longitudinal axis of the bolt 7 as shown in Figures 1 and 2, said portion 10 being allowed to tilt by reason of the fact that this portion has its bore enlarged as at 14 to provide clearance about the bolt. The effect of this tilting of the portion 10 is to widen the groove 12 at one side with a corresponding widening of the portion 11 at this point and a narrowing of the portion 11 and the groove 12 at the opposite side so that the threads of the bolt and nut are expanded at the first named side of the device while said threads are narrowed at the other side, thus providing a permanent change or distortion of the threads whereby the nut is firmly locked against backing off of the bolt.

Referring to Figures 5 and 6, the same nut is shown threaded home upon the bolt with the locking portion 10 first or nearest the objects to be bolted together. Considerable force is applied to the nut after the face of the portion 10 engages the sheet of iron 6, and said portion 10 is then caused to gradually fold backwardly so as to produce a drawing action upon the threads of the nut for stretching the same or expanding them until the wall of the tapered bore 14 is flattened into contact with the member 6 and lying substantially at right angles to the longitudinal axis of the bolt as shown clearly in Figure 6. In order to clearly indicate the relative position of the parts in using the nut in this way, the wall of the bore of the portion 10 is indicated at 14' in Figure 6 while the normal face of the portion 10 is indicated by the numeral 15. The reason that the threads are expanded in this operation seems to be that the portion 10 undergoes a sort of pivotal movement about an annular axis between the wall of the bore of the portion 10 and the periphery of said portion 10 with the margin of the portion 10 folding backwardly and the inner margin of the portion 11 moving outwardly. This produces a permanent distortion of the threads of the bolt and nut within the portions 9 and 10 which will be substantially uniform entirely around the bolt and the nut will be effectively held against backing off of the bolt. It will thus be seen, that the nut will effectively lock irrespective of which end is screwed upon the bolt first, and that the combination of the external groove 12 and the enlarged bore portion 14 is essential to the practical operation in either instance.

Another manner in which the nut in Figures 3 and 4 may be employed is to thread the nut upon the bolt with the body portion 9 first as in Figures 1 and 2 after which the portion 10 may be struck upon its face 15 so as to cause the same action to take place as that illustrated with respect to the member 10 in Figure 6 but not entirely around the bolt so that expansion of the threads of the nut and bolt will be caused at the particular portion where the member 10 is forced inwardly by the blow of the hammer thereon.

In the form of the invention shown in Figures 7 and 8, the nut is constructed of the two end portions 9' and 10' which are connected by the thin yielding and substantially non-resilient ring-like portion 11' formed by the provision of the external annular groove 12' midway between the opposite faces of the nut, the bore of the nut being provided with the usual thread 13' of constant pitch which extends entirely through the portion 11' and terminates inwardly of the faces of the portions 9' and 10', the bores of said portions 9' and 10' for the remainder of the length thereof being outwardly flared as at 14'. This produces a double-ended nut which will operate no matter which end of the nut is threaded onto the bolt first and it also provides means for doubly locking the nut upon the bolt by reason of the fact that the portion 9' if screwed on first, will undergo the operation of the member 10 of Figure 6 while the member 10' may then be given a blow to undergo the operation described with respect to member 10 in Figure 2.

In Figures 9 and 10, a still further modification is shown involving a central body portion 9" and end locking portions 10" connected by thin yielding substantially non-resilient ring-like portions 11" produced by the formation of two parallel external grooves 12" in the nut blank. In this form of the invention, the internal thread of constant pitch is denoted by the numeral 13" and extends continuously through the portions 11" and 9" while the bores of the members 10" are preferably smooth and outwardly flared as at 14". In a manner similar to the nut shown in Figures 7 and 8, this nut of Figures 9 and 10 is double-ended and may be employed with a double-locking function by the flattening of one of the members 10" as shown in Figure 6 with respect to the member 10 and the tilting of the other member 10" as shown with respect to the member 10 in Figure 2.

The advantage of a nut lock of the present kind is that the same may be readily screwed home upon the bolt because of the fact that the distortion takes place subsequent to this and screwing of the nut onto the bolt is therefore not impractical as is the case with lock nuts which are distorted before engaging the bolt. Another advantage particularly characteristic of the present invention is that the same will meet with all of the requirements for a successful commercial use as the same can be conveniently manufactured in considerable quantity without any extra metal working operations, it being possible to form the annular external groove or grooves 12 or 12″ in an ordinary nut making machine by the provision of additional cutters and it being possible to form the flared bore or bores 14, 14′, and 14″ at the same time that the threaded bore is formed.

In practice, it has been found that the present nut will, when employed in any of the manners above described, become firmly and permanently locked to the bolt or substantially so to an extent to meet with all of the requirements of a device of this kind.

It will thus be seen that the present invention provides a nut lock including a body portion and a locking portion connected by an annular yielding substantially non-resilient portion, the body portion being indicated at 9 in the form of Figure 1 with the portion 10 therein, the locking portion, while in the form of Figures 7 and 8, either one of the portions 9′ or 10′ may be considered the body portion while the other will be the locking portion. In a like manner, with respect to the form of the invention shown in Figures 9 and 10, the portion 9″ will constitute the body portion and either one or both of the portions 10″ will constitute the locking portion or portions.

From the foregoing description, it is believed that the construction and operation of the present invention will be readily understood and appreciated by those skilled in the art.

Minor changes may be made without departing from the spirit and scope of the invention as claimed.

What is claimed as new is:

1. A lock nut comprising a nut having a body portion and a locking portion, and an annular yielding substantially non-resilient connection for connecting said two portions, the body portion and the connection both having a continuous thread adapted to easily screw on a bolt and said portions and said connection all having a common bore which is enlarged within the locking portion.

2. A lock nut comprising a nut having a body portion and a locking portion, and an annular yielding substantially non-resilient connection for connecting said two portions, the body portion and the connection both having a continuous thread adapted to easily screw on a bolt and said portions and said connection all having a common bore which is enlarged within the locking portion, said enlarged portion of the bore having its wall of outwardly flaring form.

3. A lock nut comprising a nut having a body portion and a locking portion, an annular yielding substantially non-resilient portion connecting said first named portions, said yielding connecting portion having a continuous thread adapted to easily screw on a bolt and the bore of the nut being enlarged in said locking portion whereby displacement of the latter relative to the body portion will cause distortion of threads for locking the nut upon a bolt.

4. A lock nut comprising a nut having a pair of end locking portions, means connecting said locking portions including an annular yielding substantially non-resilient portion, the nut having its bore enlarged in said locking portions and provided with a continuous thread in the connecting portion adapted to easily screw on a bolt.

5. A lock nut comprising a nut having an intermediate body portion and a pair of end locking portions, annular yielding substantially non-resilient connecting portions for the body portion and the locking portions, said body portion and connecting portions having a continuous thread adapted to easily screw on a bolt, and said locking portions having enlarged bores whereby the same may be readily displaced relative to a bolt and the body portion for distorting threads of the nut and bolt.

6. A lock nut comprising a nut having a body portion and a locking portion, an annular yielding non-resilient portion connecting said body portion and said locking portion, said body portion and said connecting portion having a continuous thread adapted to screw easily onto a bolt, and said locking portion having an enlarged bore whereby the same may be distorted by the comparatively larger force which is transmitted by said body portion upon forcible screwing of the nut with the locking portion first upon a bolt in engagement with the member to be bolted.

7. A lock nut comprising a nut having a body portion and a locking portion, an annular yielding non-resilient portion connecting said body portion and said locking portion, said body portion and said connecting portion having a continuous thread adapted to screw easily onto a bolt, and said locking portion having an enlarged bore whereby the same may be distorted by the comparatively larger force which is transmitted by said body portion upon forcible screwing of the nut with the locking portion first upon a bolt in engagement with the member to be bolted, said enlarged bore being of outwardly flared form and the connecting portion being formed by the provision of an annular external groove in the nut blank whereby the wall of the flared bore will be flattened in engagement with the member to be bolted so as to lie substantially at right angles to the longitudinal axis of the bolt for causing a drawing action to expand threads of said connecting portion.

8. A lock nut comprising a nut having two end portions, means including an annular yielding substantially non-resilient portion for connecting said two portions, said nut having a bore provided with a continuous thread for a portion of its length adapted to easily screw on a bolt and being enlarged for the rest of its length within one of said first named portions, said connecting portion having said thread extended therethrough and being formed by an annular external groove in the nut blank substantially concentric with the bore of the nut.

In testimony whereof I affix my signature.

HARRY G. NORWOOD.